(12) United States Patent  (10) Patent No.: US 8,662,685 B2
Sim  (45) Date of Patent: Mar. 4, 2014

(54) SYSTEM AND METHOD OF OPERATING A SIDE MIRROR OF A VEHICLE

(75) Inventor: Young Seok Sim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/418,213

(22) Filed: Mar. 12, 2012

(65) Prior Publication Data

US 2012/0200949 A1  Aug. 9, 2012

Related U.S. Application Data

(62) Division of application No. 11/647,475, filed on Dec. 27, 2006, now abandoned.

(30) Foreign Application Priority Data

Oct. 16, 2006 (KR) .......................... 10-2006-0100521

(51) Int. Cl.
   *G02B 5/08* (2006.01)
   *G02B 7/182* (2006.01)
   *B60R 1/06* (2006.01)

(52) U.S. Cl.
   USPC ........... 359/841; 359/843; 359/877; 307/10.1

(58) Field of Classification Search
   USPC .......................... 359/841, 843, 877; 307/10.1
   See application file for complete search history.

(56) References Cited

U.S. PATENT DOCUMENTS

| | | | |
|---|---|---|---|
| 3,749,480 A * | 7/1973 | De Witt et al. ................ | 359/843 |
| 4,267,494 A * | 5/1981 | Matsuoka et al. ......... | 318/568.1 |
| 4,798,967 A | 1/1989 | Yamana et al. | |
| 4,936,671 A | 6/1990 | Kaspar | |
| 4,973,146 A | 11/1990 | Nakayama | |
| 4,981,347 A | 1/1991 | Nakayama | |
| 4,981,349 A * | 1/1991 | Tamiya et al. ................ | 359/877 |
| 5,008,603 A | 4/1991 | Nakayama et al. | |
| 5,315,442 A | 5/1994 | Sato et al. | |
| 5,339,192 A | 8/1994 | Cho | |
| 5,514,940 A | 5/1996 | Okamoto | |
| 5,640,281 A | 6/1997 | Cho | |
| 6,087,795 A | 7/2000 | Amagasa et al. | |
| 6,243,218 B1 * | 6/2001 | Whitehead ................... | 359/877 |
| 6,695,118 B2 | 2/2004 | Kurita et al. | |
| 6,719,358 B2 * | 4/2004 | Schmidt et al. .............. | 296/152 |
| 7,287,867 B2 | 10/2007 | Wellington et al. | |
| 7,322,709 B2 * | 1/2008 | Kurumagawa et al. ....... | 359/872 |
| 7,325,936 B2 * | 2/2008 | Sakamoto et al. ............ | 359/843 |
| 2004/0120059 A1* | 6/2004 | Motomiya et al. ............ | 359/877 |

FOREIGN PATENT DOCUMENTS

| | | | |
|---|---|---|---|
| JP | 4-110245 A | | 4/1992 |
| JP | 6-293237 A | | 10/1994 |
| JP | 7-144579 A | | 6/1995 |
| JP | 11-96853 | * | 4/1999 |
| JP | 2002-347522 A | | 12/2002 |
| JP | 2005-306277 A | | 11/2005 |
| KR | 1998-063525 U | | 11/1998 |
| KR | 10-2005-0094172 A | | 9/2005 |

* cited by examiner

*Primary Examiner* — Ricky D Shafer
(74) *Attorney, Agent, or Firm* — Morgan, Lewis & Bockius LLP

(57) ABSTRACT

A system of a side mirror of a vehicle includes: a driving motor which is driven by input electric power and supplies a driving force for rotating the side mirror from a folding position to an unfolding position or rotating the side mirror from the unfolding position to the folding position; a switch selecting unfolding or folding of the side mirror; an electric power source supplying electric power to the driving motor; and a mirror driving unit supplying electric power to the driving motor from the electric power source according to a signal of the switch, and performing a blocking cancellation operation of reversing a rotation direction of the side mirror.

2 Claims, 9 Drawing Sheets

SYSTEM AND METHOD OF OPERATING A SIDE MIRROR OF A VEHICLE

CROSS-REFERENCE TO A RELATED APPLICATION

This application is a Divisional of U.S. patent application Ser. No. 11/647,475, filed Dec. 27, 2006, which claims priority to Korean Patent Application No. 10-2006-0100521 filed in the Korean Intellectual Property Office on Oct. 16, 2006, the disclosure of which is incorporated herein by reference.

BACKGROUND OF THE INVENTION (a) Field of the Invention

The present invention relates to a system and method of operating a side mirror of a vehicle. In particular, the system and method of the present invention can fold or unfold a side mirror when an operational error occurs.

(b) Description of the Related Art

A side mirror is installed to a front pillar or a side door of a vehicle so as to obtain rear view.

A side mirror of a vehicle includes a mirror, a mirror housing supporting the mirror, and a supporter fixing the mirror housing to a side door.

Since the side mirror protrudes from the side of a vehicle, another vehicle may collide with it. Additionally, the side mirror may prevent problems when parking a vehicle in a tight spot. In order to solve this problem, the side mirror is configured to be foldable. The side mirror can be manually folded or can be folded by a motor which is installed in the mirror housing.

An electrically folded side mirror includes parts which are disposed inside the vehicle and parts which are disposed in the mirror housing. Parts which are disposed inside the vehicle include a switch which is located inside a door trim and controls the folding and unfolding operations of the side mirror; and a polarity conversion circuit which is disposed in the door and controls the electric power input to a motor from a battery and the direction of electric power input according to a switching operation of the switch. Parts which are disposed in the mirror housing include a motor; a gear device including a plurality of gears such as a warm gear which transfers driving force of the motor to the supporter and a hinge connected to the door; and a circuit breaker which prevents excessive current from being applied to the motor.

There is a problem in that the side mirror may not be folded and unfolded in spite of the operation of the motor. Such a malfunction of the side mirror may be caused by mismatching between parts of the system. For example, after the side mirror is unfolded by the rotation of the motor, the side mirror may not fold even though the motor operates to fold the side mirror. In particular, if there is a temperature difference between a folding timing and an unfolding timing, gears may be firmly engaged to one another by the temperature drop, and this may cause the side mirror not to rotate. A state that the driving motor cannot operate even through electric power is supplied is called a blocking state.

In such a case, if a driver toggles the switch to the folding position and the unfolding position so as to repeat the folding operation the unfolding operation of the side mirror, the blocking state may be cancelled.

Therefore, there is a need for a system and method of operating a side mirror of a vehicle that cancels the blocking state of a side mirror of a vehicle. The present invention provides such a system and a method.

SUMMARY OF THE INVENTION

The present invention provides a system and method of operating a side mirror of a vehicle which cancels a blocking state of a side mirror.

In one embodiment of the invention, a system of using a side mirror on a vehicle comprises: a driving motor which is driven by input electric power and supplies a driving force for performing an unfolding rotation of rotating the side mirror from a folding position to an unfolding position or performing a folding rotation of rotating the side mirror from the unfolding position to the folding position; a switch for selecting unfolding or folding of the side mirror; an electric power source supplying electric power to the driving motor; and a mirror driving unit supplying electric power to the driving motor from the electric power source according to a signal of the switch, and performing a blocking cancellation operation of reversing a rotation direction of the side mirror and then returning when the blocking state of the side mirror occurs while the side mirror rotates.

In one embodiment, the driving motor may be a bidirectional motor which can rotate forward or reverse depending on a direction of an electric power input. The mirror driving unit may determine a direction of an electric power input to the driving motor from the electric power source according to a signal of the switch. The blocking cancellation operation may be performed by reversing a direction of an electric power input to the driving motor and again returning to an original electric power direction.

In another embodiment, the blocking cancellation operation may be repeated several times.

In another embodiment, the blocking cancellation operation is repeated and the reverse time of an electric power input in the blocking cancellation operation may be set to be shorter than a previous reverse time.

In another embodiment, the system further comprises: a controller which receives a selected signal of the switch and generating a signal according to the input signal; a relay driving circuit which receives the signal of the controller and supplies a relay driving signal; a relay which is switched according to the signal applied to the relay driving circuit so as to apply electric power of the electric power source to an electric power passage in a forward or reverse direction; and a current detector which detects current to the driving motor and supplies a corresponding signal to the controller.

In another embodiment, the mirror driving unit may be installed in a side door of a driver seat.

In another embodiment, the driving system may further include a detector for detecting the completion of the folding operation and the unfolding operation of the side mirror.

In another embodiment, a method of operating a side mirror of a vehicle comprises: receiving a switching signal of a switch regarding folding/unfolding of the side mirror; applying electric power to a driving motor in a current direction corresponding to the switching signal; determining whether blocking in the side mirror occurs; if it is determined that the blocking in the side mirror occurs, reversing the driving motor for an electric power by reversing a direction of an electric power input to the driving motor; and returning a rotation direction of the driving motor to an original direction thereof after the reversing the driving motor.

In another embodiment, the blocking may include: detecting an initial starting current of the driving motor; detecting whether a restraint current is generated in the driving motor;

and if it is determined that the restraint current is generated in the driving motor, determining whether the restraint current is generated by a completion of an operation of the driving motor or by a blocking of the side mirror.

In another embodiment, the method may further include detecting whether a regular current of the driving motor occurs, after detecting the initial starting current of the driving motor.

In another embodiment, the restraint current may be greater than or equal to the initial starting current.

In another embodiment, the determination of whether the restraint current is generated by a completion of an operation of the driving motor or by a blocking of the side mirror may compare a duration time of a regular current with a predetermined operation completion time, and may also determine that the restraint current is generated by the blocking of the side mirror if the duration time of the regular current is shorter than or equal to the operation completion time.

In another embodiment, the determination of whether the restraint current is generated by a completion of an operation of the driving motor or by a blocking of the side mirror may determine whether the operation completion signal has been input after the restraint current is generated, and may also determine that the blocking occurs if it is determined the operation completion signal is not input.

In another embodiment, the operation completion signal may be information on a rotation angle of the driving motor.

In another embodiment, the operation completion signal may be a signal input from a sensor installed at a folding completion position and an unfolding completion position of the side mirror.

In another embodiment, the determining step may be performed again after the reversing.

In another embodiment, the electric power direction reverse time may be shorter than a predetermined time in the previous reversing of the electric power direction when the reversing the electric power direction is repeated.

In another embodiment, if the repeat number of the reversing the electric power direction is greater than a predetermined number, an electric power input to the driving motor may be cut off, and malfunction of the side mirror may occur.

DETAILED DESCRIPTION OF THE INVENTION

Exemplary embodiments of the present invention will hereinafter be described in detail with reference to the accompanying drawings.

Figure 1:
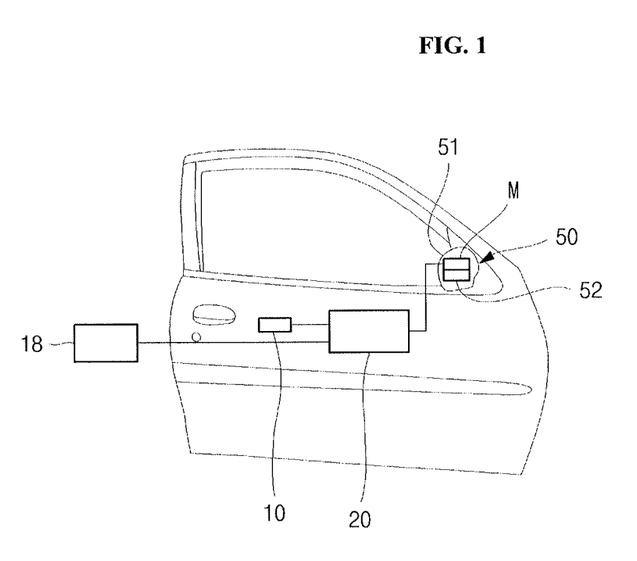
FIG. 1 is a schematic diagram of a system of using a side mirror of a vehicle according to an exemplary embodiment of the present invention.
Figure 2:
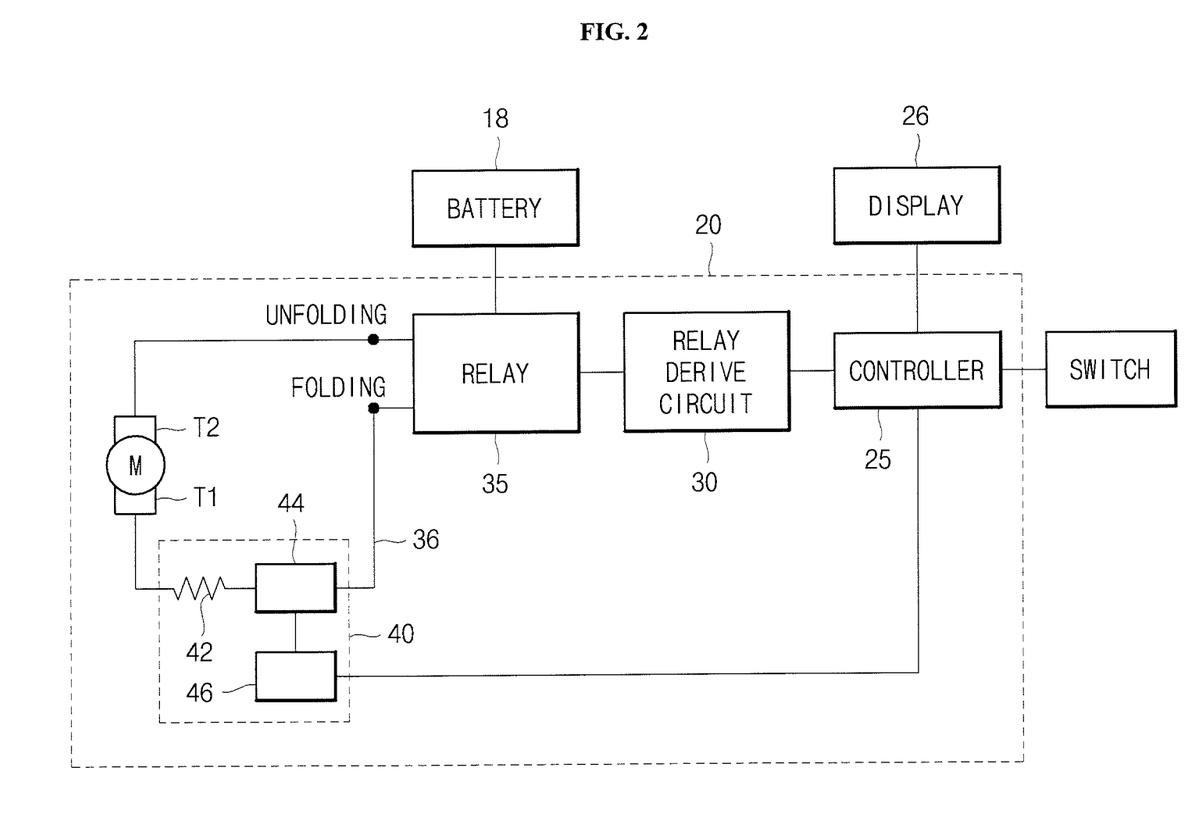
FIG. 2 is a diagram of a mirror driving unit of a system of using a side mirror of a vehicle according to an exemplary embodiment of the present invention.

As shown in FIG. 1 and FIG. 2, a system for a side mirror of a vehicle according to an exemplary embodiment of the present invention includes a driving motor M.

The driving motor M is installed within a mirror housing 51, and is supplied with electric power from an electric power source 18 such as a battery which is disposed in an engine room of a vehicle so as to rotate. The driving motor M is assembled with a device 52 which operate by a driving force of the driving motor M so as to fold and unfold a side mirror.

In an exemplary embodiment of the present invention, the driving motor M is realized as a bidirectional motor which can rotate in forward and reverse directions depending on a direction of electric power input to the driving motor M from the electric power source 18.

In this specification, rotation of a side mirror 50 from a folded position to an unfolded position is defined as an unfolding operation. Rotation of the side mirror 50 from the unfolded position to the folded position is defined as a folding operation. Furthermore, rotation of the driving motor M so as to make the side mirror 50 perform the folding operation is defined as a folding rotation. Meanwhile, rotation of the driving motor M so as to make the side mirror 50 perform the unfolding operation is defined as an unfolding rotation.

A system of a side mirror of a vehicle according to an exemplary embodiment of the present invention includes a switch 10 for selecting the folding and unfolding operations of the side mirror 50. The switch 10 is disposed near the driver's seat (i.e., an instrument panel or a door). If the switch 10 is selected as the folding operation, electric power is supplied to the driving motor M in a direction for performing the folding rotation by a mirror driving unit 20. If the switch 10 is selected as the unfolding operation, electric power is supplied to the driving motor M in a direction for performing the unfolding rotation by the mirror driving unit 20. Electric power input directions for the folding rotation and the unfolding rotation are opposite to one another.

A system of a side mirror of a vehicle according to an exemplary embodiment of the present invention includes the mirror driving unit 20, which controls electric power input to the driving motor M from the electric power source 18. The mirror driving unit 20 may be installed within a side door of a driver's seat. In an exemplary embodiment of the present invention, the mirror driving unit 20 realizes an operation of a circuit breaker which is installed in the mirror housing 51, so that the conventional circuit breaker can be omitted.

According to an exemplary embodiment of the present invention, the mirror driving unit 20 includes a controller 25; a relay driving circuit 30; a relay 35; and a current detector 40.

The controller 25 receives a switching signal of the switch 10, detects a switching direction of the switch 10 based on the switching signal, and supplies a corresponding signal to the relay driving circuit 30.

The relay driving circuit 30 may be realized by a pair of switching transistors and supplies signals to control the relay 35 according to a signal input from the controller 25.

The relay 35 is switched by a signal input from the relay driving circuit 30 so as to determine directions of electric power input and current from the electric power source 18. A current flow passage 36 forms a circuit connecting the relay 35 and both terminals T1 and T2 of the driving motor M. The relay 35 is switched according to a signal applied from the relay driving circuit 30 such that current flow from a folding point to an unfolding point such that the current flow passage or current flow from an unfolding point to a folding point is formed. In this specification, current flow in a state that a folding point is (+) and an unfolding point is ground. Additionally, it is also determined that the driving motor M rotates in a forward direction so as to perform the folding rotation. Meanwhile, current flow in a state that a folding point is ground and an unfolding point is (+) is defined as a reverse flow. Additionally, it is determined that the driving motor M rotates in a reverse direction so as to perform the unfolding rotation.

Figure 3:
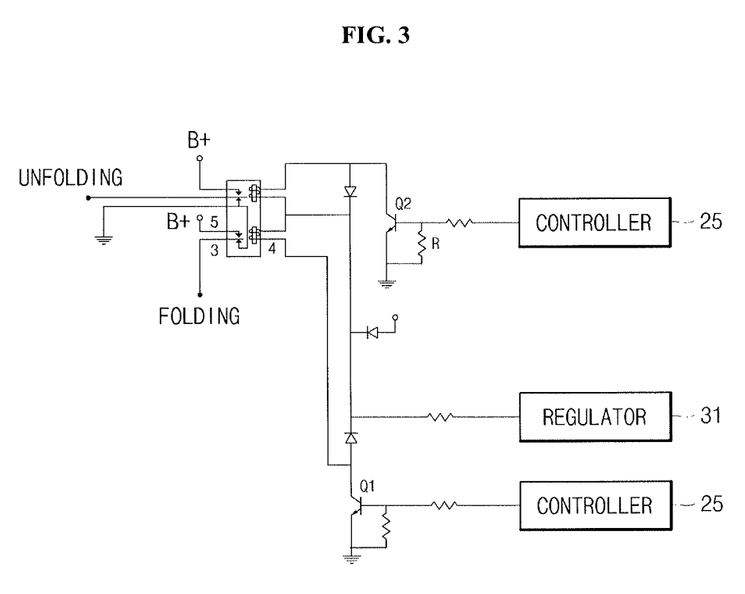
FIG. 3 is a circuit diagram including a driving circuit and a relay.

FIG. 3 is a circuit diagram including a driving circuit and a relay.

Referring to FIG. 3, the relay driving circuit 30 includes a first switching transistor Q1 and a second switching transistor Q2.

If unfolding is selected in the switch 10, the controller 25 detects a signal of the switch 10 so as to turn on the first switching transistor Q1 of a relay driving circuit and to turn off the second switching transistor Q2. Accordingly, in a current flow of the relay 35, the unfolding side becomes B+, and the folding side becomes ground. In an electric power passage, the electric power source is driven in a forward flow passage, so that the driving motor M undergoes the folding rotation.

If folding is selected in the switch 10, the controller detects a signal of the switch 10 so as to turn off the first switching transistor Q1 in the relay driving circuit and to turn on the second switching transistor Q2. Accordingly, output of the relay is performed such that the folding side is B+ and the unfolding side is ground. Therefore, the driving motor M undergoes the folding rotation.

An embodiment of the present invention includes the current detector 40 which detects current generated in the driving motor M and which supplies a corresponding digital signal to the controller.

Referring to FIG. 2, an example of the current detector 40 includes a shut resistor 42 which is installed in a current flow passage; an amperemeter 44 which is connected to the shut resistor 42 in series; and an AD converter 46 converting a detected signal of the amperemeter into a digital signal and supplying the converted signal to the controller 25. At this time, the shut resistor 42 may form a resistor within the amperemeter 44, and the AD converter 46 may be built in the amperemeter.

Figure 4:
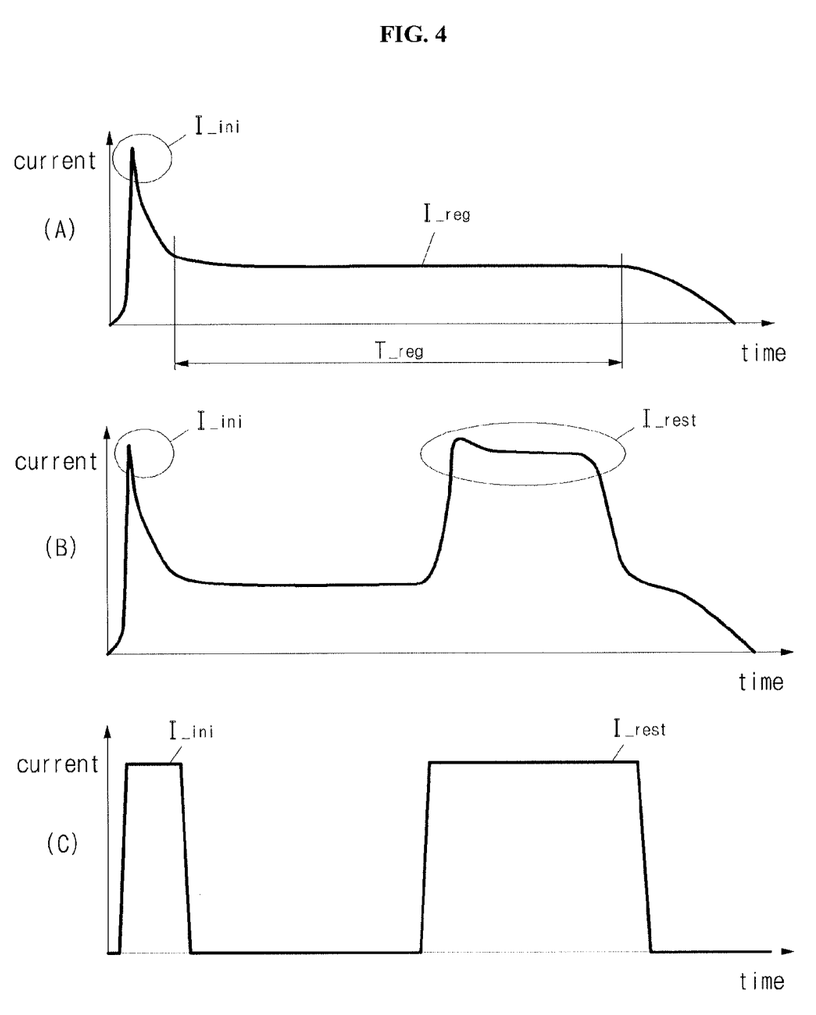
FIG. 4 shows current waveforms which are generated by a driving motor in a system of a side mirror of a vehicle according to an exemplary embodiment of the present invention.

FIG. 4 shows current waveforms which are generated by a driving motor in a driving system of a side mirror of a vehicle according to an exemplary embodiment of the present invention.

A graph (A) of FIG. 4 shows a current waveform of the driving motor M when the side mirror normally operates.

If the driving motor M starts to operate, an initial starting current I_ini is generated, a regular current I_reg is generated with the rotation of the driving motor M, and the driving motor M rotates in a forward direction or in a reverse direction in the regular current state. Since a folding completion position and an unfolding completion position of the side mirror are substantially constant, the duration time of the regular current I_reg is also constant. Accordingly, it is possible that the duration time of the regular current is defined as an operation completion time T_rev.

A graph (B) of FIG. 4 shows a current waveform of the driving motor M when a blocked state has occurred in the side mirror. A graph (C) of FIG. 4 shows a conversion of a signal of (B) to a digital signal.

Referring to a graph (A) of FIG. 4, while the side mirror normally operates, the folding operation or the unfolding operation of the side mirror is performed while the regular current I_reg state continues for T_rev. However, as shown in a graph (C) of FIG. 4, if the blocked state of the side mirror occurs, the restraint current I_rest which is deviated from the state of I_reg is generated in the driving motor M before time of T_rev lapses.

In other words, the blocked state of the side mirror is defined as a state that the driving motor M stops to rotate before the folding rotation or the unfolding rotation is completed.

The blocked state of the side mirror may be caused by mismatching of the driving motor and related parts. Examples of mismatching include mismatching of the driving motor M and a gear which receives power from the driving motor M, and mismatching of mechanical devices 52 such as a gear, a hinge, etc. The blocked state may be caused by assembling errors of respective parts of the mechanical devices 52, and expansion and contraction of part due to a temperature change.

If the blocked state of the side mirror 50 occurs when the folded side mirror 50 is unfolded, the restraint current I_rest, which is deviated from the regular current I_reg in the driving motor M, and the restraint current I_rest approximates to the initial starting current I_ini. Accordingly, it may be determined that the blocked state has occurred if the restraint current I_rest occurs before the time T_rev lapses while the driving motor M operates in the regular current state.

Referring to FIG. 2 and FIG. 3, the controller 25 stores information of the time of T_rev, which is the time for completing the folding and the unfolding of the side mirror. The controller 25 also determines whether the restraint current I_rest has occurred before the time of T_rev lapses based on a signal input from the current detector 40. The controller also determines whether the duration time of the waveform of I_rest is greater than a predetermined duration time T_predet, thereby determining whether the blocked state of the side mirror occurs. The predetermined duration time T_predet is set in order not to perform a blocking cancellation operation in the case the blocked state is immediately cancelled after it has occurred.

As such, the controller 25 is programmed to determine that there is a blocked state of the side mirror 50 if the current of I_rest occurs for more than the time of T_rest before the time of T_rev lapses in the driving motor M, and to perform the blocking cancellation operation.

The blocking cancellation operation is performed by reversing a direction of electric power which is supplied to the driving motor M and then recovering. For example, if the blocked state occurs while the driving motor M undergoes the unfolding rotation by electric power input in the reverse direction, the controller 25 controls the relay driving circuit 30 so as to reverse electric power flow passage to the driving motor M by the relay 35 for an electric power reverse time T_solv, and then controls again the relay driving circuit 30 so as to recover reversely the current flow.

Accordingly, the driving motor M rotates in the forward direction at the blocking occurrence position while rotating in the reverse direction. The mismatching state can be cancelled by the blocking cancellation operation as such, and thereby the unfolding operation of the side mirror 50 can be terminated.

If the blocked state is not cancelled by one time of the blocking cancellation operation, the controller 25 performs the blocking cancellation operation repeatedly, and at this time, the controller 25 performs conversion of direction of electric power with an electric power reverse time shorter than the previous electric power reverse time T_solv.

In the case that the blocked state is not cancelled in spite of the repeat of the performing of the blocking cancellation operation, the controller 25 controls the relay driving circuit 30 so as to control the relay 35 in a deactivated state, thereby stopping the operation of the driving motor M, and informs a driver the stopping of the operation of the side mirror by the blocked state. The number of the repeat of the blocking cancellation operation may be selectively set, and may preferably be four times to five times. A display 26 is disposed near a driver seat and may use a light emitting device such as an LED.

A driver may recognize a situation through messages on the display 26, and a driver may manually operate the side mirror 50 or may repair the same.

Figure 5:
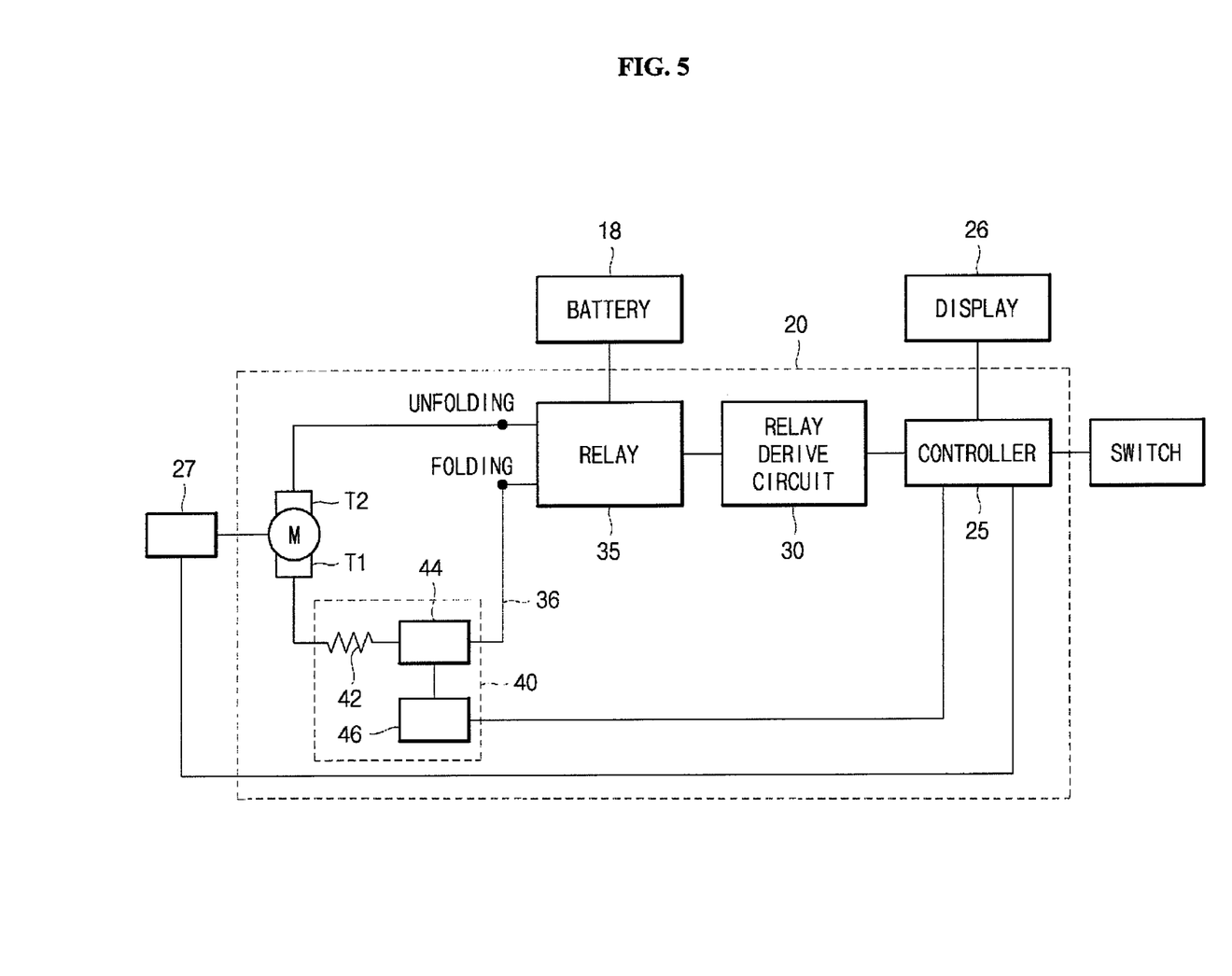
FIG. 5 is a diagram of a system of a side mirror of a vehicle according to another exemplary embodiment of the present invention.

FIG. 5 is a diagram of a system of a side mirror of a vehicle according to another exemplary embodiment of the present invention.

A system of a side of a vehicle according to another embodiment of the present invention uses a rotating angle sensor 27 which senses a rotating angle of the driving motor as a means for detecting the completion of the folding and the unfolding of the side mirror.

The rotating angle of the driving motor M is constant when the side mirror rotates between the folding position and the unfolding position. Accordingly, in the case that the restraint current occurs, the rotating angle of the driving motor M is detected. It can be determined that the blocked state occurs if the driving motor M does not rotate by the rotating angle which is necessary for the completion of the operation.

Figure 6:
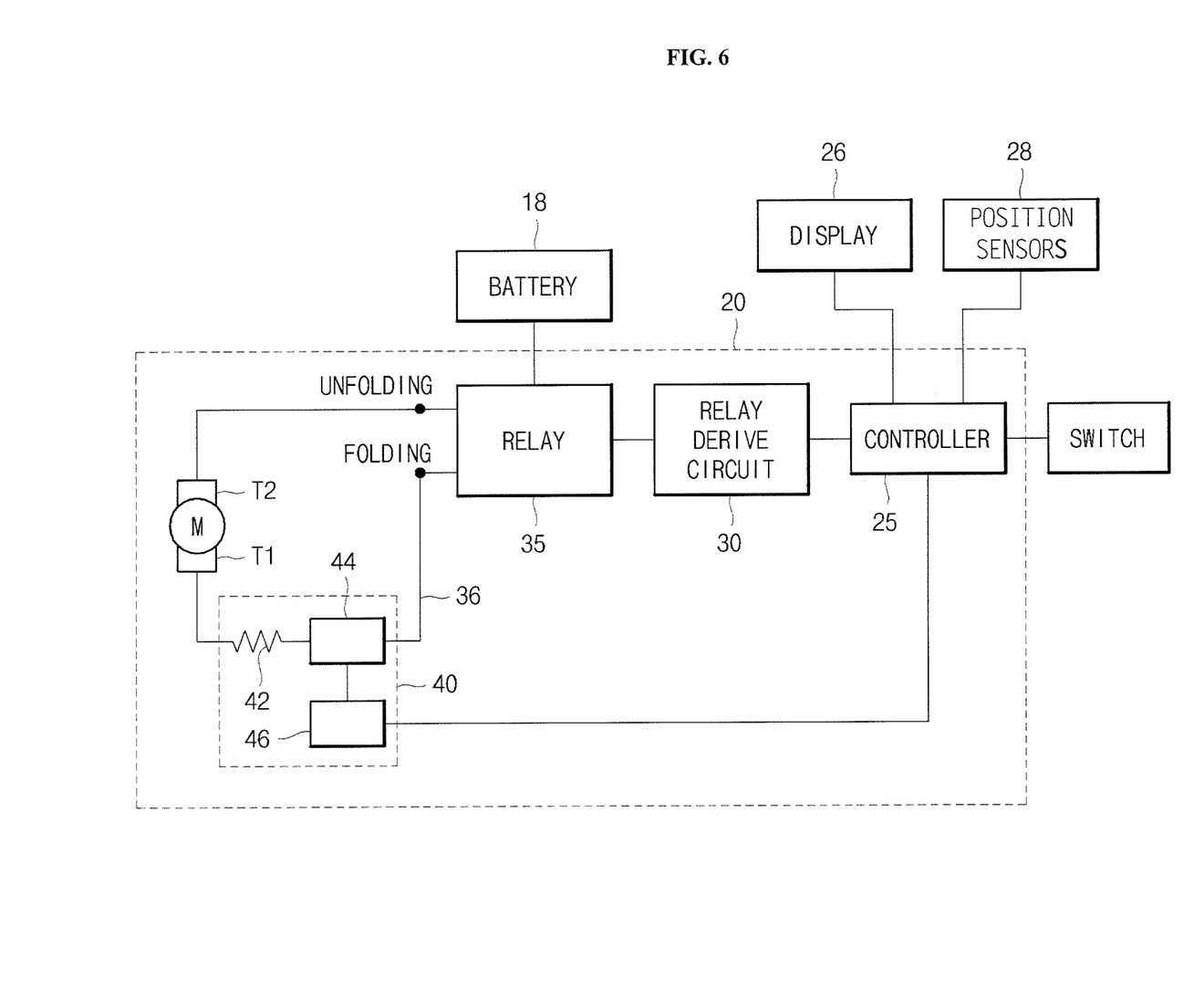
FIG. 6 is a diagram of a driving system of a side mirror of a vehicle according to still another exemplary embodiment of the present invention.

FIG. 6 is a diagram of a system of a side mirror of a vehicle according to still another exemplary embodiment of the present invention.

In another embodiment, a system of a side mirror of a vehicle includes position sensors 28 which are installed at the folding completion position and the unfolding completion position of the side mirror as a means for detecting the completion of the folding and the unfolding of the side mirror.

In yet another embodiment of the present invention, in the case that the restraint current occurs, it can be determined that the operation of the side mirror has been completed based on a signal input from the position sensor 28. It can also be determined that the blocked state of the side mirror occurs if the restraint current is generated before the operation of the side mirror is completed.

Figure 7:
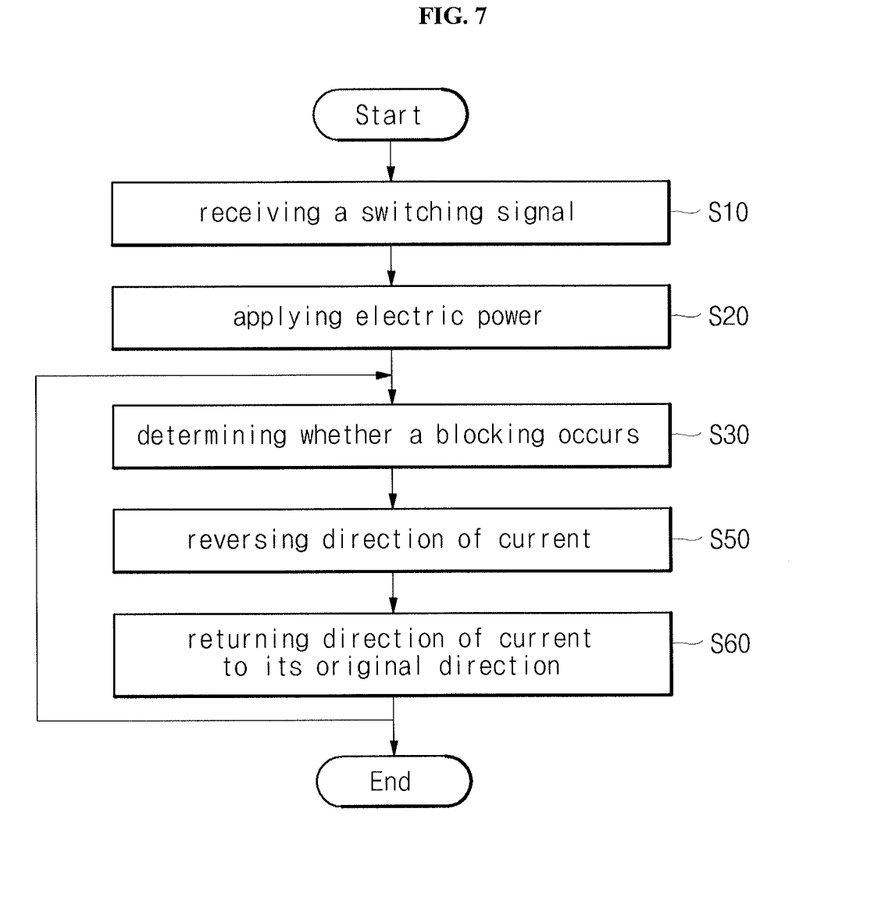
FIG. 7 is a flowchart of a driving method of a side mirror of a vehicle according to an exemplary embodiment of the present invention.

FIG. 7 is a flowchart of a method of operating a side mirror of a vehicle according to an exemplary embodiment of the present invention.

A method of operating a side mirror of a vehicle according to an exemplary embodiment of the present invention includes: a step S10 of receiving a switching signal of the switch 10 regarding folding/unfolding of the side mirror; a step S20 of applying electric power to the driving motor M in the current flow direction corresponding to the switching signal; a step S30 of determining whether blocking has occurred in the side mirror; a step S50 of reversing the driving motor for a predetermined electric power reverse time by converting electric power input direction of the driving motor M in a reverse direction if it is determined that the blocking has occurred in the side mirror; and a step S60 of recovering the rotation direction of the driving motor by returning to the original electric power input direction after the step S50.

The step S10 receives the switching signal from the switch 10 and selects whether the side mirror is folded or unfolded.

The step S20 of applying the electric power determines the electric power input direction to the driving motor M according to the switching signal input in the step S10. If the folding is selected in the switch 10, the controller 25 supplies a corresponding signal to the relay driving circuit 30, and the relay 35 controls contact points of the relay 35 such that electric power flow for making the driving motor M rotate in the folding direction is generated. On the contrary, if the unfolding is selected in the switch 10, the relay controls contact points of the relay such that electric power flow for making the driving motor M rotate in the unfolding direction is generated.

Accordingly, the relay 35, which is deactivated, is started so as to supply electric power to the driving motor M from the electric power source 18, and the driving motor M rotates according to the predetermined electric power input direction.

The step S30 determines whether the blocking of the side mirror occurs during the rotation of the driving motor M.

Figure 8:
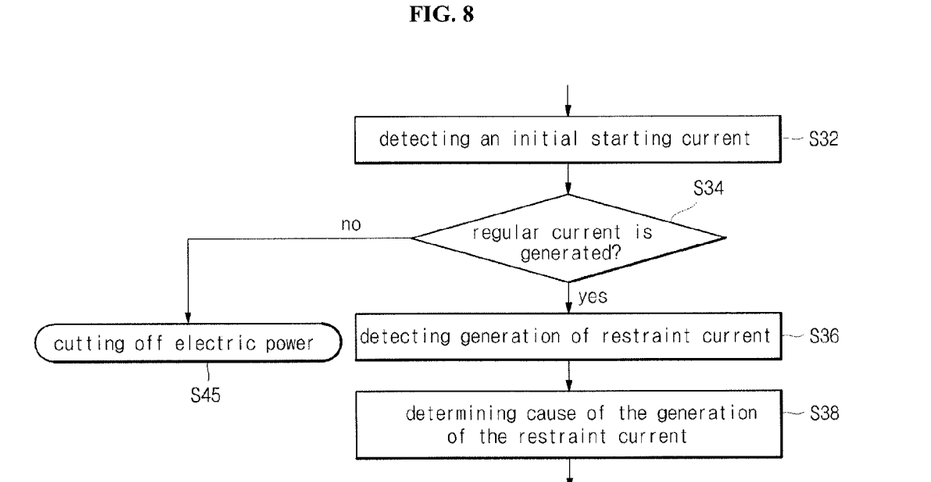
FIG. 8 is a flowchart showing determining whether a side mirror is caught in a driving method of a side mirror of a vehicle according to an exemplary embodiment of the present invention.

FIG. 8 is a flowchart showing determining whether a side mirror is caught in a method of operating a side mirror of a vehicle according to an exemplary embodiment of the present invention.

Referring to FIG. 8, the step S32 includes detecting an initial starting current of the driving motor M. If the electric power is supplied to the driving motor M in a stopped state, the initial starting current I_ini is generated. The controller 25 receives the detected value of the initial starting current I_ini from the current detector 40 and stores the value.

Subsequently, at step S34, whether the regular current has occurred in the driving motor M is detected. The regular current I_reg is a current which is generated after the forward rotation or the reverse rotation of the driving motor M has been started, and is lower than the starting current I_ini. The regular current I_reg may be defined as a value less than or equal to a predetermined value or a predetermined value % of the starting current I_ini.

If the generation of the regular current is not detected, this means that the driving motor M has not rotated from the beginning, and this corresponds to a state that a driver selects the switch 10 as the folding in a state that the side mirror 50 has been completely folded, or selects the switch 10 as the unfolding in a state that the unfolding has been completed. Accordingly, if the regular current is not detected, the controller 25 controls the relay to be deactivated so as to cut off the electric power input to the driving motor M.

The step S34 of detecting the generation of the regular current may be omitted in embodiments shown in FIG. 5 and FIG. 6. In other words, whether the switching direction of the switch 10 is mistaken can be determined based on information input from the rotating angle sensor 27 and the position sensor 28.

Subsequently, at step S36, it is determined whether the restraint current has been generated in the driving motor M. The generation of the restraint current corresponds to a state that the driving motor M does not rotate in spite of the electric power input to the driving motor M, and a current in this state has a value corresponding to the initial starting current. Accordingly, the restraint current is defined as a value greater than or equal to the starting current.

Subsequently, at step S38, the cause of the generation of the restraint current is determined. In this step, it is determined whether the restraint current generated in the driving motor M is caused by the completion of the operation of the driving motor M or by the blocking of the side mirror.

If the operation of the driving motor M is completed, the driving motor M cannot rotate in spite of the electric power input, so the restraint current is generated. Accordingly, if the restraint current is detected, it is determined whether the restraint current has been generated by the fact that the operation of the driving motor M has been completed, i.e., that the driving motor M cannot rotate any more since the folding operation or the unfolding operation of the side mirror 50 has been completed, or by the blocking of the side mirror.

Figure 9:
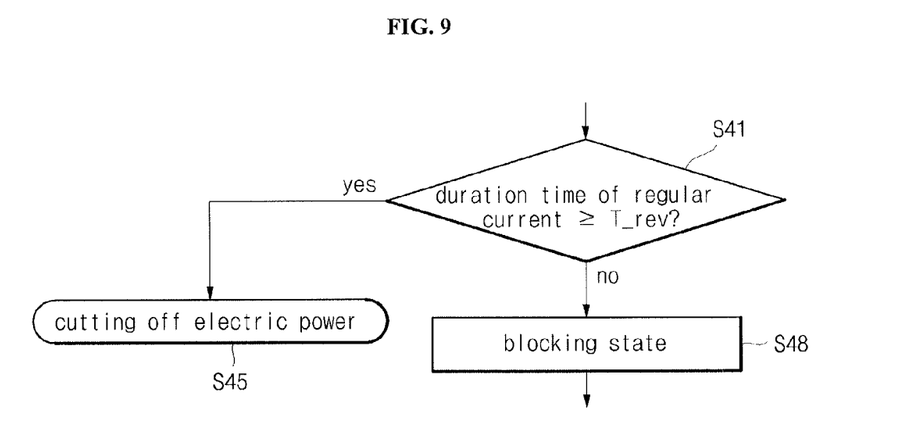
FIG. 9 to FIG. 11 are flowcharts respectively showing examples of determining the cause of restriction current.
Figure 10:
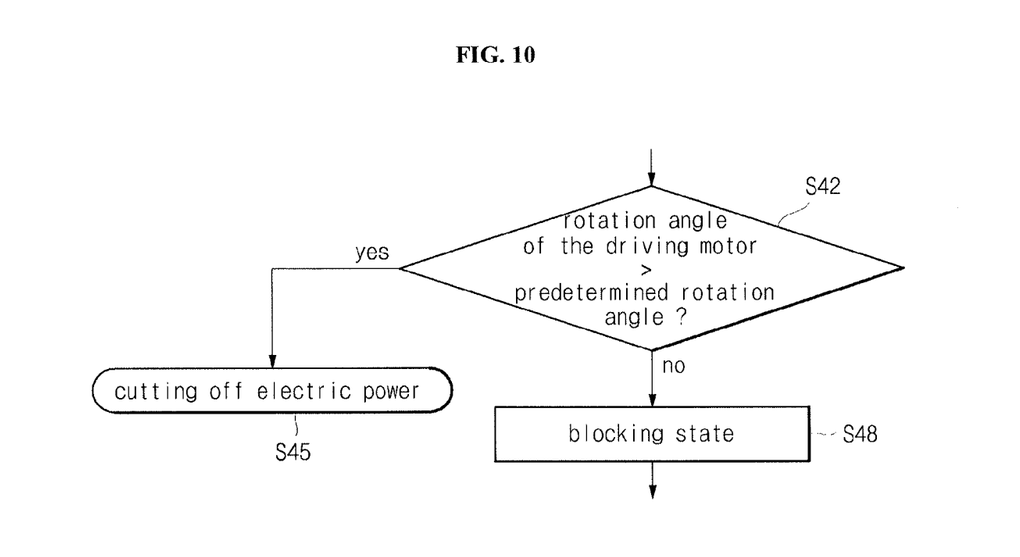
Figure 11:
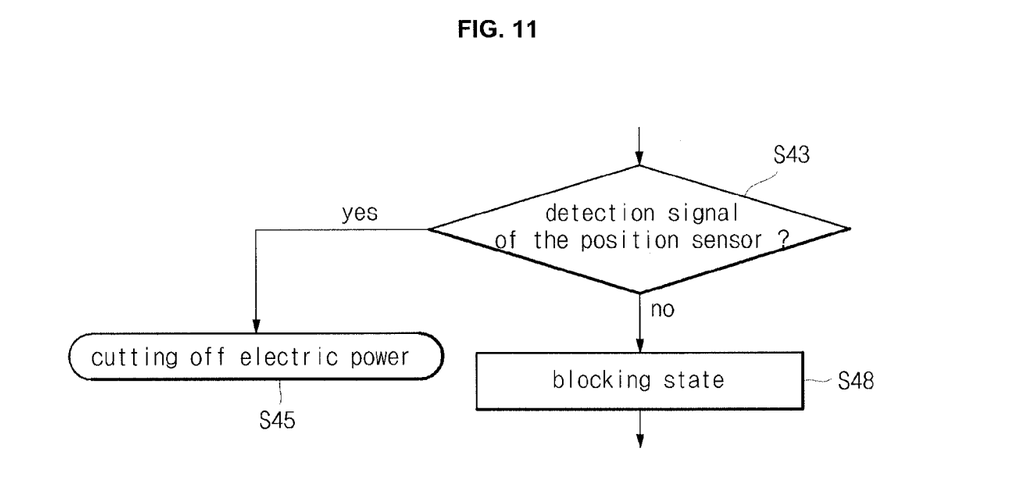

FIG. 9 to FIG. 11 are flowcharts respectively showing examples of determining the cause of restriction current.

Referring to FIG. 9, a predetermined operation completion time T_rev is used as a basis for determining the cause of the generation of the restraint current. The operation completion time T_rev may be set as information which is detected while testing the normal operation after the side mirror is installed and is then stored in the controller.

The operation completion time T_rev is a rotation time of the driving motor M while the side mirror moves between the folding position and the unfolding position, and is substantially equal to a duration time of the regular current while the side mirror rotates between the folding position and the unfolding position. Since the folding position and the unfolding position of the side mirror are constant, the rotation time of the driving motor M is also substantially constant. Accordingly, by determining whether the duration time of the regular current is greater than or equal to the operation completion time, it can be determined whether the blocking occurs, at step S41.

In the case that the duration time of the regular current is greater than or equal to the operation completion time, the folding operation or the unfolding operation of the side mirror has been completed by the rotation of the driving motor M. Accordingly, electric power input to the driving motor is cut off at step S45.

However, in the case that the duration time of the regular current is less the operation completion time, it is meant that the driving motor M has not rotated by a rotating angle or amount of rotation at which the operation of the side mirror is completed, so in this state it is determined that the restraint current is generated by the blocking of the side mirror at step S48.

Referring to FIG. 10, information on the rotating angle of the driving motor M which is detected by the rotating angle sensor 27 is used as a basis of the determination of the cause of the generation of the restraint current.

As described above, since the folding position and the unfolding position of the side mirror are constant, the rotation angle of the driving motor M is also substantially constant. Accordingly, if it is determined that the restraint current is generated, the controller 25 determines whether the driving motor M has rotated by more than a predetermined rotation angle on the basis of information detected by the rotation angle sensor 27, at step S42. If there is no signal indicating that the driving motor M has rotated by more than the predetermined rotation angle, i.e., there is no input of the operation completion signal, it is determined that the restraint current is generated by the blocking of the side mirror at step S48. If a signal indicating that the driving motor M has rotated by the predetermined rotation angle so as to complete the operation on the basis of information of the rotating angle sensor 27 after the generation of the restraint current is input, it is determined that the restraint current is generated by the completion of the operation of the driving motor M, and the relay is controlled to be in a deactivated state so as to cut off electric power supply to the motor at step S45.

Referring to FIG. 11, the information detected by the position sensors 28 which are disposed at the folding position and the unfolding position of the side mirror is used as a basis of the determination of the cause of the restraint current, at step S43.

In the case that there is no signal input from the position sensor 28 in a state that the restraint current is generated, it is determined that the restraint current is generated by the blocking of the side mirror at step S48. If the restraint current is generated in a state that information that the side mirror is moved to the operation completion position is input from the position sensor 28, it is determined that the restraint current is generated by the completion of the operation of the driving motor M, and the relay is controlled to be in a deactivated state so as to cut off the electric power to the motor S45.

Referring again to FIG. 7, if it is determined that the blocking of the side mirror occurs at step S30, the controller 25 converts direction of the electric power input the driving motor M in a reverse direction so as to reverse the electric power supply direction for a predetermined electric power reverse time, thereby performing the step S50 of reversing the rotation direction of the driving motor M. For example, while the driving motor M is rotating in the forward direction, the driving motor M rotates in a reverse direction.

The subsequent step S60 is a step for returning the reversed rotation direction to the original electric power flow direction so as to return the rotation direction of the driving motor M.

By performing the steps S50 and S60, the blocking of the side mirror should be cancelled, and the folding operation or the unfolding operation can be completed.

The blocking state of the side mirror 50 may not be cancelled in spite of performing the steps S50 and S60, and in order to solve this problem, it may be set that the blocking determination step S30 may be again performed after the step S60.

At this time, the electric power reverse time of the re-performed reverse step S50 is set to be shorter than the electric power reverse time of the previous reverse step S50.

In the case that the blocking of the side mirror is not cancelled in spite of the repeated performing of the reverse step and the returning step, the side mirror may be manually operated or the side mirror driving system should be repaired.

Accordingly, the controller counts the number of the performing of the electric power reverse step, and if the number becomes greater than a predetermined number, electric power input to the driving motor M is cut off. Then, a step of informing malfunction of the side mirror may be performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving system of a side mirror of a vehicle, comprising:
    a driving motor which is driven by input electric power and supplies a driving force for rotating the side mirror from a folding position to an unfolding position or rotating the side mirror from the unfolding position to the folding position;
    a switch which selects unfolding or folding operation of the side mirror;
    an electric power source supplying electric power to the driving motor;
    a mirror driving unit supplying electric power to the driving motor from the electric power source according to a signal of the switch, and performing a blocking cancellation operation; and a detecting means for detecting completions of the folding operation and the unfolding operation of the side mirror;

wherein the detecting means is a rotating angle sensor provided for sensing a rotating angle of the driving motor to detect the completions of the folding and unfolding operations of the side mirror;

wherein the mirror driving unit comprises:
- a controller receiving a selected signal of the switch and generating a signal according to an input signal;
- a relay driving circuit receiving the signal generated in the controller and supplying a relay driving signal;
- a relay which is switched according to the relay driving signal from the relay driving circuit so as to apply electric power of the electric power source to an electric power passage in a forward direction or in a reverse direction; and
- a current detector detecting current to the driving motor and supplying a corresponding signal to the controller.

2. The driving system of claim 1, wherein the mirror driving unit is installed in a side door of a driver seat.

\* \* \* \* \*